3,021,189
TREATMENT OF COKE OVEN GAS
Edgar B. Mancke, Joseph E. Schmuk, and Frank M. Temmel, Bethlehem, Pa., assignors to Bethlehem Steel Company, a corporation of Pennsylvania
Filed Oct. 2, 1958, Ser. No. 764,955
8 Claims. (Cl. 23—3)

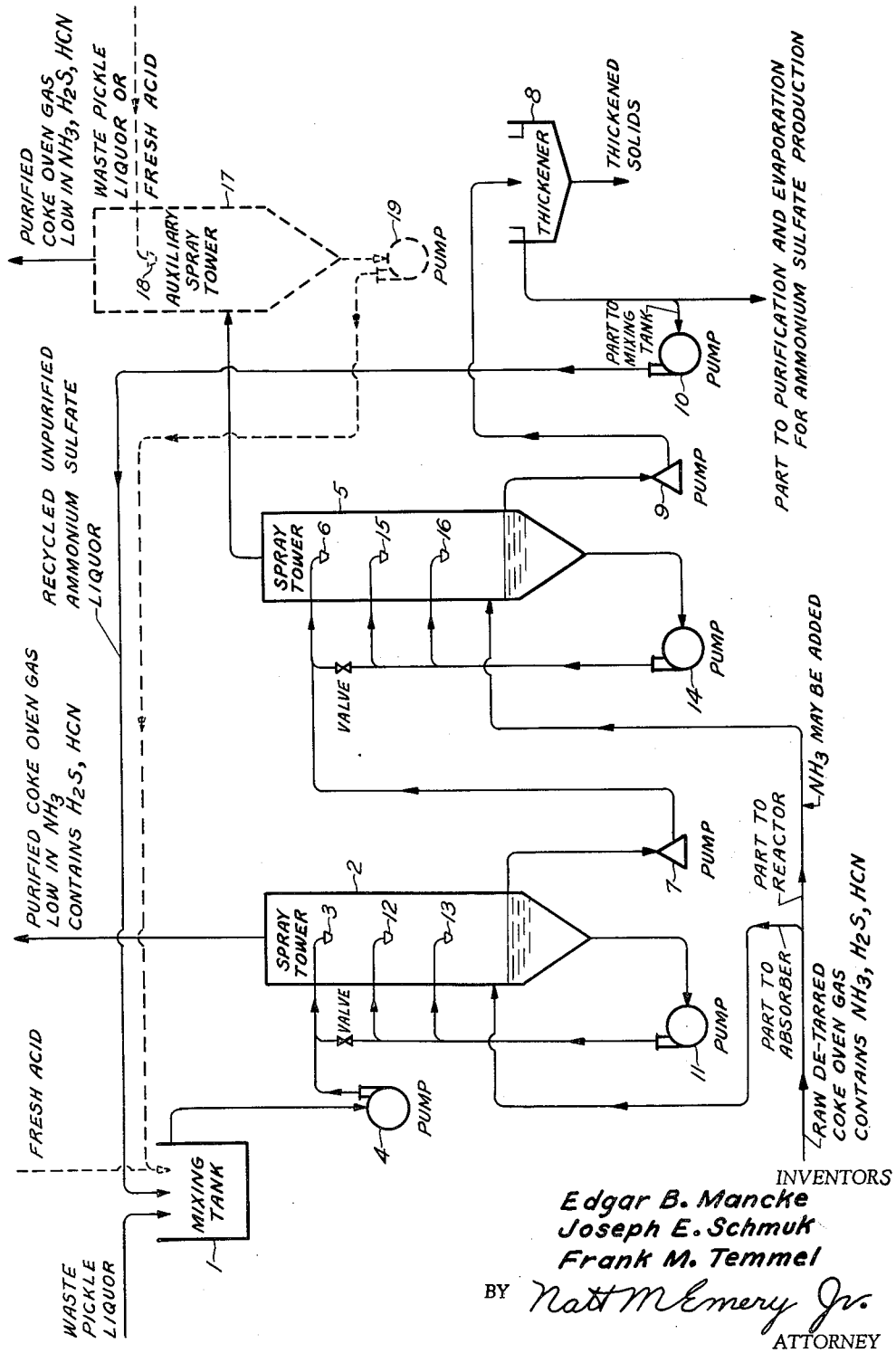

This invention relates to the utilization of a waste liquor containing sulfuric acid and ferrous sulfate in the removal of ammonia and acidic gases from coke oven gas, and more particularly to the production of a coke oven gas quite low in hydrogen sulfide.

The principal object of this invention is to remove substantially all of the ammonia from coke oven gas, while at the same time removing a substantial part of the hydrogen sulfide and hydrogen cyanide from a portion of the gas.

In known methods of treating coke oven gas with a liquor such as that obtained from the pickling of steel and containing sulfuric acid and ferrous sulfate, substantially all of the ammonia is removed from the gas. However, by these methods of treatment, acidic gases, such as hydrogen sulfide and hydrogen cyanide, are only partially removed. For certain uses, acidic gases can be tolerated in the coke oven gas, but, when coke oven gas is used as a fuel in steel open hearth furnaces, for example, the hydrogen sulfide content should be quite low, to minimize sulfur contamination of the steel.

In one method of treating coke oven gas with waste pickle liquor to remove ammonia from the gas and to thereby produce a fuel type coke oven gas, the treating liquor will consist of raw pickle liquor and liquor recycled in the process. Some additional fresh acid may be necessary if there is insufficient acid to meet the stoichiometric requirements of the ammonia reaction. By adding recycled liquor and fresh acid to the system, the efficiency of the system is improved and the treating solution is maintained in balance.

In a recycling system, two reactor columns are used and the treating liquor is introduced into the first column, or ammonia absorber, in a downward direction in the form of a spray, and counter-current to coke oven gas which rises through the absorber. The gas introduced into the absorber has already passed through a second reactor column, in which some of the ammonia has been removed from the gas. The remaining ammonia is removed in the absorber by contact of the acid with the ammonia in the gas, ammonium sulfate being formed and remaining in the liquor which goes to the bottom of the absorber, the substantially ammonia-free gas leaving the absorber at the top. Part of the liquor in the absorber is recycled through the absorber and the remainder is piped to the second reactor column where it is flowed downwardly in the form of a spray, countercurrent to coke oven gas introduced at the bottom of the reactor, and supplied from the gas main.

The liquor entering the second reactor column has a higher pH than does the liquor entering the first column, due to the reaction with ammonia in the first column. The pH of the liquor entering the second column may be 3, or slightly higher. At, and above, this pH, hydrogen sulfide in the coke oven gas reacts with the iron sulfate of the pickle liquor to form a precipitate of iron sulfide.

While the method just outlined is quite satisfactory for removal of ammonia from the gas, the amount of hydrogen sulfide remaining in the gas is above the desired point for the use of such gas as fuel in open hearth furnaces.

We have found that when the gas stream is divided into two portions, with one portion passing through the first reactor countercurrent to a stream of fresh waste pickle liquor, or liquor of similar composition such as the waste liquor obtained from the production of titania, usually combined with some recycled liquor, having a pH below 3 or 3.5, and the second portion of the gas passing through another reactor, countercurrent to the liquor which has previously been reacted with the first portion of gas, both portions of treated gas will have had most of the ammonia stripped from them, while the second portion of treated gas will be quite low in hydrogen sulfide as well.

The drawing is a flow sheet indicating the course taken by the coke oven gas and the waste pickle liquor during the reacting period.

As one example of the manner by which our invention can be practiced, a raw waste pickle liquor, which when mixed with recycled liquor contains 50.8 g./l. of ferrous sulfate ($FeSO_4$) and 33 g./l. of sulfuric acid, with a pH of 1.2 is introduced from mixing tank 1 into the top of reactor 2 and spray nozzle 3, by means of pump 4, from where the liquor is sprayed downwardly through the reactor countercurrent to upflowing raw coke oven gas which enters reactor 2 at the bottom. The gas introduced into the reactor contains approximately 350 grains of ammonia per 100 cu. ft., 400 grains of hydrogen sulfide per 100 cu. ft. and 20 grains of hydrogen cyanide per 100 cu. ft. The coke oven gas travels through the reactor at a rate approximately of from 5 to 20 feet per second, and the reacting pickle liquor effectively strips the ammonia from the gas. The purified reacted gas, containing less than 1 grain of ammonia per 100 cu. ft., leaves the reactor at the top. This gas contains substantially all of the hydrogen sulfide and hydrogen cyanide originally present, but it is quite satisfactory for ordinary fuel purposes. Part of the reacted liquor, in which the pH has now risen to between 3.0 and 3.5, is withdrawn from the bottom of reactor 2, and introduced into reactor 5 at spray nozzle 6 by means of pump 7, from which it is sprayed downwardly through reactor 5, countercurrent to a fresh stream of raw coke oven gas introduced at the bottom of reactor 5. The rate of gas flow in reactor 5 is of the same order of magnitude as the rate in reactor 2. The pH of the liquor in reactor 5 is permitted to rise from about 3.5 to about 7 to 7.8, or possibly higher. The gas, upon leaving reactor 5 contains less than 5 grains of ammonia per 100 cu. ft., about 60 grains of hydrogen sulfide per 100 cu. ft., and about 10 grains of hydrogen cyanide per 100 cu. ft.

In the example, it should be noted that the quantities of ammonia and hydrogen sulfide, in the gas being treated in reactor 5, just about fulfill the stoichiometric requirements for the amounts of ammonia and hydrogen sulfide removed, when they react with the acid and iron sulfate present in the reactor. With some coke oven gases, it may be necessary to supplement the ammonia content of the gas being introduced into reactor 5. This can be accomplished by introducing ammonia from weak ammonia liquor produced in other parts of the coke making operation. In like manner, if the amount of sulfate ($SO_4$) in the waste pickle liquor is insufficient to react stoichiometrically with the total amount of ammonia in the system, some fresh sulfuric acid must be added to maintain a proper balance.

In reactor 2 the following reaction takes place:

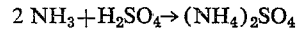

$$2\,NH_3 + H_2SO_4 \rightarrow (NH_4)_2SO_4$$

In reactor 5, hydrogen sulfide reacts with ferrous hydroxide to form iron sulfide according to the following equations:

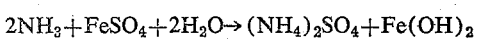

$$2NH_3 + FeSO_4 + 2H_2O \rightarrow (NH_4)_2SO_4 + Fe(OH)_2$$

$$Fe(OH)_2 + H_2S \rightarrow FeS + 2H_2O$$

Precipitated iron sulfide is withdrawn from reactor 5 in the form of a slurry, part of the slurry is recycled, and part of the solids is separated from the liquid in thickener 8, to which it is pumped by means of pump 9. Part of the separated liquor from tank 8, after purification, goes to conventional evaporation and crystallization equipment for the production of ammonium sulfate crystals, and part is recycled by means of pump 10, and mixed with fresh waste pickle liquor feed for reactor, or absorber, 2.

In a continuous process such as this, part of the reacted treating liquor from the bottom of reactor 2 should be recirculated, by means of pump 11 to reactor 2, and through spray nozzles 12 and 13. Likewise, part of the treating liquor from the bottom of reactor 5 should be recirculated by means of pump 14, to reactor 5, and through spray nozzles 15 and 16. The volume of liquor leaving reactors 2 and 5 by means of the overflow system is approximately equal to the volume of feed liquor.

The gas leaving reactor 5 is quite low in ammonia and the hydrogen sulfide has been reduced to a point where the gas is satisfactory as a fuel gas for most steel open hearth furnaces. Furthermore, the cyanide content of the treated gas is low.

In the event that it is desired to produce a gas lower in ammonia content than that produced in reactor 5, an auxiliary reactor 17 could be used, the gas from reactor 5 would pass upwardly through this auxiliary reactor, counter-current to a downward flow of raw waste pickle liquor or fresh acid from spray nozzle 18. The waste pickle liquor introduced into reactor 17 may be from the same source as that used in reactor 2. As this reactor would be used solely to remove any small amount of undesirable ammonia which may remain in the gas after treatment in reactor 5, most efficient results would be obtained in auxiliary reactor 17 if the waste pickle liquor used therein has a pH below 3.5. The acid from reactor 17 can be circulated, by means of pump 19, to the main liquor supply line and reused in reactor 2, and, as an alternative, some of the acid may be recirculated to reactor 17.

Optimum results are obtained when our method is operated as a continuous process.

By our method, with the same type of waste sulfate liquor, and in the same quantity, ammonia can be removed from an equal volume of gas as in any prior art method. Our method has the additional advantage of producing, in from one-third to one-half of the total gas volume treated, a coke oven gas in which the hydrogen sulfide content has been lowered to a value where this portion of the gas can be used for specialty fuel purposes. The method represents a notable saving in cost, for in prior art methods, where it is desired to produce any portion of gas low in hydrogen sulfide, the gas is usually subjected to an additional treating step after removal of the ammonia.

The volume of gas that may be treated in reactor 5, depends on the iron content of the sulfate liquor. For optimum conditions, the pH of the liquor in each reactor should be controlled approximately within the ranges given in the example, although satisfactory low sulfur gas can be obtained on smaller portions of the total gas stream with pH values differing somewhat from those of the example. For instance the pH of the liquor leaving the first reactor may range from 2.8 to 3.7, while the pH of the liquor leaving the second reactor may reach a value of 8. We do not wish to be restricted to these limits, for the actual operating pH ranges will depend on circumstances, i.e. on the content of ammonia and hydrogen sulfide in the gas, and on the composition of the treating liquor.

As pickling operations vary, depending on the products being pickled, their waste liquors will also vary in composition. Thus it may be desirable to adjust the composition, on occasion, by adding sulfuric acid or ferrous sulfate. Normally, the type of waste sulfate liquor which would be used in a large scale operation, would require only a minimum of adjustment.

We claim:

1. In a continuous process, the method of removing ammonia and acidic gases from coke oven gas which comprises treating a portion of said gas with sulfate liquor of low pH containing sulfuric acid and ferrous sulfate and continuing the treatment until the pH of the treating liquor rises to about 3.5, then using the liquor to treat a fresh portion of said gas until the pH of the liquor rises to at least 6.8.

2. In a continuous process, the method of treating coke oven gas containing ammonia and acidic gases which comprises passing a portion of said gas through waste sulfate pickle liquor having a low pH and containing sulfuric acid and ferrous sulfate until the pH of the liquor rises to about 3.5 and thereby removing substantially all of the ammonia from the gas, thereafter passing another portion of said gas through the liquor until the pH of the liquor rises to about 7.8 and thereby removing a substantial amount of the ammonia and of the acidic gases.

3. The method of removing ammonia and acidic gases from coke oven gas which comprises treating a portion of said gas with waste sulfate pickle liquor having a pH below 3.5 and containing sulfuric acid and ferrous sulfate and continuing the treatment until the pH of the treating liquor rises to about 3.5, then using the liquor to treat a fresh portion of said gas until the pH of the liquor rises to at least 6.8.

4. In a continuous process, the method of removing ammonia and acidic gases from coke oven gas which comprises treating a portion of said gas with waste sulfate pickle liquor having a pH below 3.5 and containing sulfuric acid and ferrous sulfate until the pH rises to about 3.5 and thereby reducing the ammonia content of the coke oven gas to less than 5 grains per 100 cu. ft., then using the liquor to treat a second portion of said gas until the pH of the liquor rises to about 7.8 and thereby reducing the ammonia content of said second portion to less than 5 grains per 100 cu ft. and reducing the acidic gas content of said second portion to less than 100 grains per 100 cu ft.

5. In the treatment of coke oven gas containing ammonia in excess of 200 grains per 100 cubic feet and hydrogen sulfide in excess of 200 grains per 100 cubic feet the method which comprises reacting a portion of said gas with a waste acidic sulfate liquor having a pH below 3.5 and containing ferrous sulfate until the free acid is substantially neutralized, then passing a second portion of said gas through the reacted liquor and thereby reducing the ammonia content of said second portion to less than 5 grains per 100 cubic feet and reducing the hydrogen sulfide content of said second portion to less than 100 grains per 100 cubic feet.

6. In a continuous process, the method of removing ammonia and hydrogen sulfide from coke oven gas which comprises treating a portion of said gas with a liquor containing ammonium sulfate and waste sulfuric acid pickle liquor, said liquor having a pH below 2.5 and containing approximately 50 g./l. of ferrous sulfate in a reaction chamber until the pH of the treating liquor rises to about 3.5, and thereby removing substantially all of the ammonia from the gas, then treating a second portion of said gas with the liquor in a reaction chamber until the pH of the liquor rises to about 6.5 and not more than about 7.8 and thereby reducing the ammonia content of said second portion of gas to less than 5 grains per 100 cu. ft. and reducing the hydrogen sulfide content of said second portion to less than 100 grains per 100 cu. ft.

7. In a continuous process, the method of removing ammonia and hydrogen sulfide from coke oven gas which comprises treating a portion of said gas in a first reactor with waste sulfate liquor containing free sulfuric acid and ferrous sulfate and continuing the treatment until the free sulfuric acid of the liquor has been substantially neutralized, then using the resulting liquor to treat a fresh portion of said gas in a separate reactor.

8. In a continuous process, the method of removing ammonia and acidic gases from coke oven gas which comprises treating a portion of said gas with sulfate liquor of low pH containing sulfuric acid and ferrous sulfate and continuing the treatment until the pH of the treating liquor rises to about 3.5, then using the liquor to treat a fresh portion of said gas until the pH of the liquor rises to at least 6.8, then contacting said fresh portion of gas with a liquor containing sulfuric acid.

References Cited in the file of this patent

UNITED STATES PATENTS

| 961,763 | Falding | June 21, 1910 |
| 2,511,307 | Tiddy et al. | June 13, 1950 |
| 2,880,061 | Muns et al. | Mar. 31, 1959 |